United States Patent
Lee et al.

(10) Patent No.: US 8,209,369 B2
(45) Date of Patent: *Jun. 26, 2012

(54) SIGNAL PROCESSING APPARATUS AND METHOD FOR PERFORMING MODULAR MULTIPLICATION IN AN ELECTRONIC DEVICE, AND SMART CARD USING THE SAME

(75) Inventors: Kyung-Hee Lee, Yongin-si (KR); Bum-Jin Im, Suwon-si (KR); Mi-Suk Huh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1330 days.

This patent is subject to a terminal disclaimer.

(21) Appl. No.: 11/849,880

(22) Filed: Sep. 4, 2007

(65) Prior Publication Data

US 2008/0065713 A1 Mar. 13, 2008

Related U.S. Application Data

(63) Continuation-in-part of application No. 10/800,181, filed on Mar. 12, 2004, now Pat. No. 7,564,971.

(30) Foreign Application Priority Data

Mar. 14, 2003 (KR) .................................. 16100-2003

(51) Int. Cl.
*G06F 7/38* (2006.01)
*G06F 7/00* (2006.01)
*G06F 15/00* (2006.01)
*G06F 7/52* (2006.01)

(52) U.S. Cl. ......... 708/491; 708/492; 708/620; 708/625

(58) Field of Classification Search .......... 708/490–492, 708/620–656

See application file for complete search history.

(56) References Cited

U.S. PATENT DOCUMENTS 5,247,605 A 9/1993 Engeler
(Continued)

FOREIGN PATENT DOCUMENTS

EP 1191740 3/2002
(Continued)

OTHER PUBLICATIONS

Wang, P.A.; Wei-Chang Tsai; Shung, C.B.; "New VLSI architectures of RSA public-key cryptosystem," Proceedings of 1997 IEEE International Symposium on Circuits and Systems, vol. 3, pp. 2040-2043, Jun. 9-12, 1997.*

(Continued)

*Primary Examiner* — Lewis A Bullock, Jr.
*Assistant Examiner* — Matthew Sandifer
(74) *Attorney, Agent, or Firm* — NSIP Law

(57) ABSTRACT

Provided is an apparatus for encryption/decryption and electronic signature in a mobile communication environment. A signal processing apparatus, performing modular multiplication in an electronic device, includes a first logic for outputting a signed multiplicand by selectively performing a one's complementary operation on a multiplicand according to a Booth conversion result of a multiplier in modular multiplication; a second logic for outputting a modulus which is signed in the modular multiplication based on a carry input value Carry-in of a current clock, determined from a carry value cin for correction of a previous clock, and on a sign bit of the multiplicand; and a third logic for receiving the signed multiplicand and the signed modulus, and calculating a result value of the modular multiplication by iteratively performing a full addition operation on a carry value C and a sum value S of the full addition operation, found at the previous clock.

25 Claims, 5 Drawing Sheets

U.S. PATENT DOCUMENTS

| | | | |
|---|---|---|---|
| 5,513,133 | A | 4/1996 | Cressel et al. |
| 5,847,981 | A | 12/1998 | Kelley et al. |
| 6,185,596 | B1 | 2/2001 | Hadad et al. |
| 6,275,841 | B1 | 8/2001 | Potter et al. |
| 6,317,769 | B1 | 11/2001 | Kobayashi et al. |
| 6,658,442 | B1 | 12/2003 | Pomet |
| 6,668,267 | B1 | 12/2003 | Pomet |
| 6,963,977 | B2 | 11/2005 | Chen et al. |
| 6,986,054 | B2 * | 1/2006 | Kaminaga et al. ............ 713/193 |
| 7,174,015 | B1 * | 2/2007 | Koc et al. ......................... 380/28 |
| 7,266,580 | B2 * | 9/2007 | Busaba et al. ................. 708/625 |
| 7,480,691 | B2 * | 1/2009 | Okumura ....................... 708/628 |
| 2001/0023425 | A1 | 9/2001 | Oberman et al. |
| 2002/0172355 | A1 * | 11/2002 | Lu et al. .......................... 380/28 |
| 2002/0194237 | A1 | 12/2002 | Takahashi et al. |
| 2003/0163503 | A1 | 8/2003 | Nguyen |
| 2004/0054705 | A1 * | 3/2004 | Le Quere ...................... 708/491 |
| 2004/0252829 | A1 * | 12/2004 | Son ................................. 380/30 |
| 2005/0198093 | A1 | 9/2005 | Son |
| 2005/0210086 | A1 | 9/2005 | Lutz et al. |
| 2006/0098824 | A1 | 5/2006 | Mao |

FOREIGN PATENT DOCUMENTS

| | | |
|---|---|---|
| JP | 62-154029 | 9/1987 |
| JP | 64-082125 | 3/1989 |
| WO | WO 02/073450 | 9/2002 |

OTHER PUBLICATIONS

Jye-Jong Leu; An-Yeu Wu; "Design methodology for Booth-encoded Montgomery module design for RSA cryptosystem," The 2000 IEEE International Symposium on Circuits and Systems, vol. 5, pp. 357-360, 2000.*

Jin-Hua Hong et al., Radix-4 Modular Multiplication and Exponentiation Algorithms for the RSA Public-Key Cryptosystem, 2000 IEEE, pp. 565-570.

Taek-Won Kwon et al., Two Implementation Methods of a 1024-Bit RSA Cryptoprocessor Based on Modified Montogmery Algorithm, 2001 IEEE, pp. 650-653.

Yan Shu et al., VLSI Implementation of RSA Cryptosystem based on the Booth-Encoded Montgomery Module, Jun. 2002.

High Speed Operation of Computer, Jan. 9, 1980.

Rivest et al., A Method of Obtaining Digital Signatures and Public-Key Cryptosystems, Communications of the ACM, Feb. 1978, vol. 21, No. 2, pp. 120-126.

Montgomery, Modular Multiplication Without Trial Division, Mathematics of Computation, vol. 44, No. 170, Apr. 1985, pp. 519-521.

Dusse et al., A Crytographic Library for the Motorola DSP56000, Advances in Cryptology, EUROCRYPT '90, pp. 230-244.

Bosselaers et al., Comparison of Three Modular Reduction Functions, Advances in Cryptology, CRYPTO '93, pp. 175-186.

"Summons to attend oral proceedings pursuant to Rule 115(1) EPC" issued by the European Patent Office (EPO) on Feb. 18, 2010, in corresponding European Patent Application No. 04005915.6.

"Official Communication" issued by the European Patent Office (EPO) dated May 31, 2007, in corresponding European Patent Application No. 04005915.6.

* cited by examiner

SIGNAL PROCESSING APPARATUS AND METHOD FOR PERFORMING MODULAR MULTIPLICATION IN AN ELECTRONIC DEVICE, AND SMART CARD USING THE SAME

PRIORITY

This application is a Continuation-in-Part application of U.S. application Ser. No. 10/800,181, filed on Mar. 12, 2004, now U.S. Pat. No. 7,564,971, and claims priority to an application entitled "APPARATUS AND METHOD FOR PERFORMING MONTGOMERY TYPE MODULAR MULTIPLICATION", filed in the Korean Intellectual Property Office on Mar. 14, 2003 and assigned Serial No. 2003-16100, the contents of which are hereby incorporated by reference.

BACKGROUND OF THE INVENTION

1. Field of the Invention

The present invention relates generally to the field of cryptography, and more particularly to an apparatus and method for performing a Montgomery type modular multiplication for use in the encryption/decryption on information and digital signature technology.

2. Description of the Related Art

In communication systems using smart cards and cyber money for electronic commerce, mobile communication devices such as cellular telephones, small-sized computers, etc., it is desirable to transport information (electronic text or data) safely by encrypting/decrypting the information or conducting a digital signature process for the information. Here, the term "digital signature" refers to a technique that "signs" electronic texts with an electronic signature in an electronic exchange of information, similar to that done conventionally on paper. With the rapid increase of the number of Internet users and the frequent transmission of personal information over the Internet, there is a vital need for safe transmission of information through unsecured channels.

Various proposed algorithms such as RSA (Rivest-Shamir-Adleman), ElGamal, Schnorr, etc., have been employed for the encryption/decryption techniques and the digital signature technology using a public key system. The RSA algorithm-based ISO (International Standard Organization)/IEC (International Electrotechnical Commission) 9796 has been adapted as an international standard of these algorithms, DSA (Digital Signature Standard) as a modification of ElGamal has been adapted in the U.S.A., GOSSTANDART (commonly abbreviated as "GOST") has been adapted in Russia, and KC-DSA has been adapted in Korea. However, various communication systems in current use have adapted many PKCSs (Public Key Cryptography Standards). The above-mentioned algorithms require operation for modular exponentiation, $m^e \bmod N$, which incorporates repetitive performance of modular multiplication, $A \cdot B \bmod N$.

Many algorithms which perform modular exponentiation and modular multiplication required to generate/verify a digital signature based on a public key cipher such as the RSA have been proposed, for example, R. L. Rivest et al, "A Method For Obtaining Digital Signatures And Public-Key Crytosystems," Communications of the ACM, Vol. 21, pp. 120-126, 1978; P. L. Montgomery, "Modular Multiplication Without Trial Division," Math. Of Comp., Vol. 44, No. 170, pp. 519-521, 1985; S. R. Dusse and B. S. Kaliski Jr., "A Cryptographic Library For The Motorola DSP5600," Proc. Eurocrypto'90, pp. 230-244, 199; and Spronger-Verlag, A. Bosselaers, R. Govaerts and J. Vandewalle, "Comparison Of Three Modular Reduction Functions," Advances in Cryptology-CRYPTO'93, pp. 175-186, 1993. From the paper by D. R. Stinson, "Cryptography", CRC Press, 1995, of these algorithms, the Montgomery algorithm has been found to be the most efficient in view of calculation efficiency in modular multiplication for modular exponentiation required for various algorithms, but it is not an efficient algorithm for simple modular multiplication. U.S. Pat. No. 6,185,596 discloses an example of an apparatus implemented by the Montgomery algorithm.

As mentioned above, many algorithms and architectures have been proposed for the public key encryption/decryption and electronic signature. However, since modular multiplication apparatuses according to most of the proposed algorithms and architectures are designed for high-speed public key encryption/decryption, they have a disadvantage in that a great number of gates are required and a large amount of power is consumed. Therefore, they are not suitable for the resource-limited environment like in the smart card.

SUMMARY OF THE INVENTION

One object of the present invention is to substantially solve at least the above problems and/or disadvantages and to provide at least the advantages below. Accordingly, an aspect of the present invention is to provide a signal processing apparatus and method for performing modular multiplication in an electronic device.

Another object of the present invention is to provide a signal processing apparatus and method for performing modular multiplication with a small number of gates in an electronic device.

It is still another object of the present invention is to provide a signal processing apparatus and method for performing modular multiplication with low power in an electronic device.

It is even still another object of the present invention is to provide a smart card device of performing modular multiplication in a system for performing encryption/decryption, authentication or electronic signature.

According to one aspect of the present invention, there is provided a signal processing apparatus for performing modular multiplication in an electronic device. The signal processing apparatus includes a first logic for outputting a signed multiplicand by selectively performing a one's complementary operation on a multiplicand according to a Booth conversion result of a multiplier in modular multiplication; a second logic for outputting a modulus which is signed in the modular multiplication based on a carry input value Carry-in of a current clock, determined from a carry value cin for correction of a previous clock, and on a sign bit of the multiplicand; and a third logic for receiving the signed multiplicand and the signed modulus, and calculating a result value of the modular multiplication by iteratively performing a full addition operation on a carry value C and a sum value S of the full addition operation, found at the previous clock.

According to another aspect of the present invention, there is provided a signal processing method for performing modular multiplication in an electronic device. The signal processing method includes outputting a signed multiplicand by selectively performing a one's complementary operation on a multiplicand according to a Booth conversion result of a multiplier in modular multiplication; finding a carry input value Carry-in of a current clock determined from a carry value cin for correction of a previous clock; outputting a modulus which is signed in the modular multiplication based on the carry input value and a sign bit of the multiplicand; and receiving the signed multiplicand and the signed modulus, and calculating a result value of the modular multiplication by iteratively performing a full addition operation on a carry value C and a sum value S of the full addition operation, found at the previous clock.

According to another aspect of the present invention, there is provided a smart card with a modular arithmetic coprocessor. The smart card includes a Read Only Memory (ROM) with a security module for processing data including a key value required for encryption, authentication or electronic signature; and a Central Processing Unit (CPU) for controlling an operation of decrypting an operation result of the modular arithmetic coprocessor and performing encryption, authentication or electronic signature using the decryption result and the security module. The modular arithmetic coprocessor includes: a first logic for outputting a signed multiplicand by selectively performing a one's complementary operation on a multiplicand according to a Booth conversion result of a multiplier in modular multiplication; a second logic for outputting a modulus which is signed in the modular multiplication based on a carry input value Carry-in of a current clock, determined from a carry value cin for correction of a previous clock, and on a sign bit of the multiplicand; and a third logic for receiving the signed multiplicand and the signed modulus, and outputting a result value of the modular multiplication by iteratively performing a full addition operation on a carry value C and a sum value S of the full addition operation, found at the previous clock.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
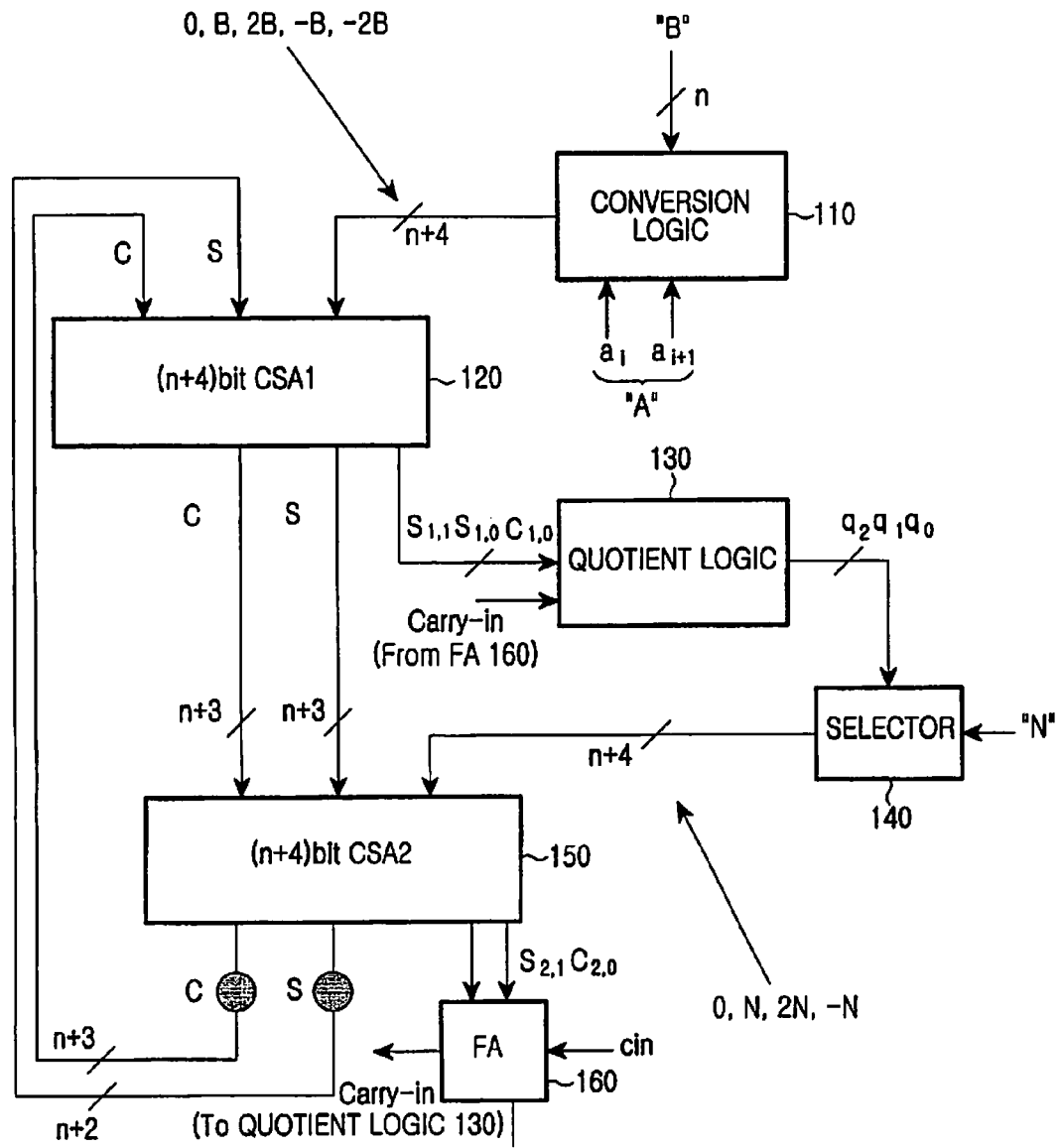
FIG. 1 is a block diagram showing a configuration of a modular multiplication apparatus in accordance with an embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein will be omitted when it may obscure the subject matter of the present invention.

A. Outline of the Invention

In the following description, the present invention discloses an apparatus and method for performing a modular multiplication, A·BmodN, by using a Montgomery algorithm, where $A = a_{n-1} \cdot 2^{n-1} + \ldots + a_1 \cdot 2 + a_0,$ $B = b_{n-1} \cdot 2^{n-1} + \ldots + b_1 \cdot 2 + b_0,$ and $N = n_{n-1} \cdot 2^{n-1} + \ldots + n_1 \cdot 2 + n_0.$ Here, A is a multiplier, B is a multiplicand, and N is a modulus, a bit size of each of which can be a large number, for example, 512 or 1024.

The modular multiplication, A·BmodN, is implemented in detail by an embodiment, which will be described. An embodiment of the present invention suggests a modular multiplication apparatus and method for calculating A·B·R−1modN in m+2 clocks with A, B and N (where $R=4^{m+2}$, m=n/2, −N≦A, and B<N), each being n bits in length, being received as inputs. A·BmodN can be calculated using a multiplication result by the suggested modular multiplication apparatus. The modular exponentiation, $m^e$modN, which is required to perform RSA operation, can be derived by iteratively calculating A·BmodN. Of the annexed drawings, FIGS. 1 to 6 are diagrams showing the configuration of the modular multiplication apparatus in accordance with an embodiment of the present invention, and FIG. 7 is a diagram showing the configuration of an IC card (smart card) to which the modular multiplication apparatuses in accordance with the embodiment of the present invention are applicable.

An embodiment of the present invention provides a modular multiplication apparatus in which bits of the multiplier A are sequentially shifted to generate a converted bit string, and a partial sum is calculated by expressing it as a one's complementary number according to a value of the converted bit string. In contrast with conventional modular multiplication apparatuses wherein only a single lower bit generated by sequentially shifting bits of the multiplier A is processed, the present invention allows the multiplication to be performed at higher speeds by processing two lower bits of the multiplier A. In this process, the present invention outputs a signed multiplicand by selectively performing a one's complementary operation on a multiplicand B according to a Booth conversion result of the multiplier A.

In other words, the modular multiplication apparatus in accordance with the embodiment of the present invention includes a conversion logic for Booth-converting the multiplier A and an operation logic for selectively performing a one's complementary operation on the multiplicand B according to a conversion result of the conversion logic, and the other elements constituting the modular multiplication apparatus are configured in compliance with the conversion logic and the operation logic to perform the proposed modular multiplication operation according to the Montgomery algorithm.

B. Embodiment of the Invention

FIG. 1 is a block diagram showing a configuration of a modular multiplication apparatus in accordance with an embodiment of the present invention.

Referring to FIG. 1, the modular multiplication apparatus includes conversion logic 110, a first carry save adder (hereinafter, abbreviated as "CSA1") 120, a quotient logic 130, a selector 140, a second CSA ("CSA2") 150, and a full adder (FA) 160. The shown modular multiplication apparatus is a hardware device for calculating A·B·R−1modN in m+2 clocks with A, B and N (where $R=4^{m+2}$, m=n/2, −N≦A, and B<N), each having n input bits, according to a Montgomery algorithm. In this embodiment, the modular multiplication apparatus has a structure for calculating A·B·$2^{-(n+4)}$modN. Each of the CSAs 120 and 150 is composed of (n+4) full adders in parallel, each of which has a 3 bit input and outputs a carry bit and a sum bit. The conversion logic 110 performs Booth conversion on the multiplier A, selectively performs a one's complementary operation on the Booth-converted value, and outputs one of the values 0, ±B, and ±2B as a signed extension bit of the (n+4) bits. The quotient logic 130 has as its inputs a least significant bit (LSB) carry value $C_{1,0}$ and two sum LSB bits $S_{1,1}$ and $S_{1,0}$ from the CSA1 120, a carry input value 'carry-in' output from the full adder 160, and a sign bit (B sign of FIG. 4) of B, and outputs $q_2q_1q_0$ of 3 bits, which is a value for determining a multiple of the modular reduction. The selector 140, which can be implemented by multiplexers (MUXs), selects and outputs one of 0, N, 2N and −N (see FIG. 1) based on a determined value of q (i.e. $q_2q_1q_0$ of 3 bits) determined in the quotient logic 130. For example, when 0, N, or 2N is selected according to lower 2 bits $q_1q_0$ of the q and the sign bit $q_2$ of the q is '1', a one's complementary value of 0, N, or 2N selected in the selector 140, and the sign bit $q_2$ itself are output to the CSA2 150. The full adder 160 performs full add operation, with two bits $S_{2,1}$ and $C_{2,0}$ output from the CSA2 150 and a carry value cin for correction of the current clock as its inputs from the quotient logic 130, and provides a result value of the full add to the next clock as a Carry-in signal to be used in the quotient logic 130.

Although not shown in detail in FIG. 1, the modular multiplication apparatus must include temporary storing registers for storing carry values and sum values, which are the outputs of the CSA1 120 and CSA2 150, respectively, for each clock, and a carry propagation adder (CPA) for adding values stored in the temporary storing registers and outputting a resultant value as a result of modular multiplication. An embodiment of the present invention provides a scheme for performing a CPA operation using the CSA2 150 without including a separate CPA.

Figure 2:
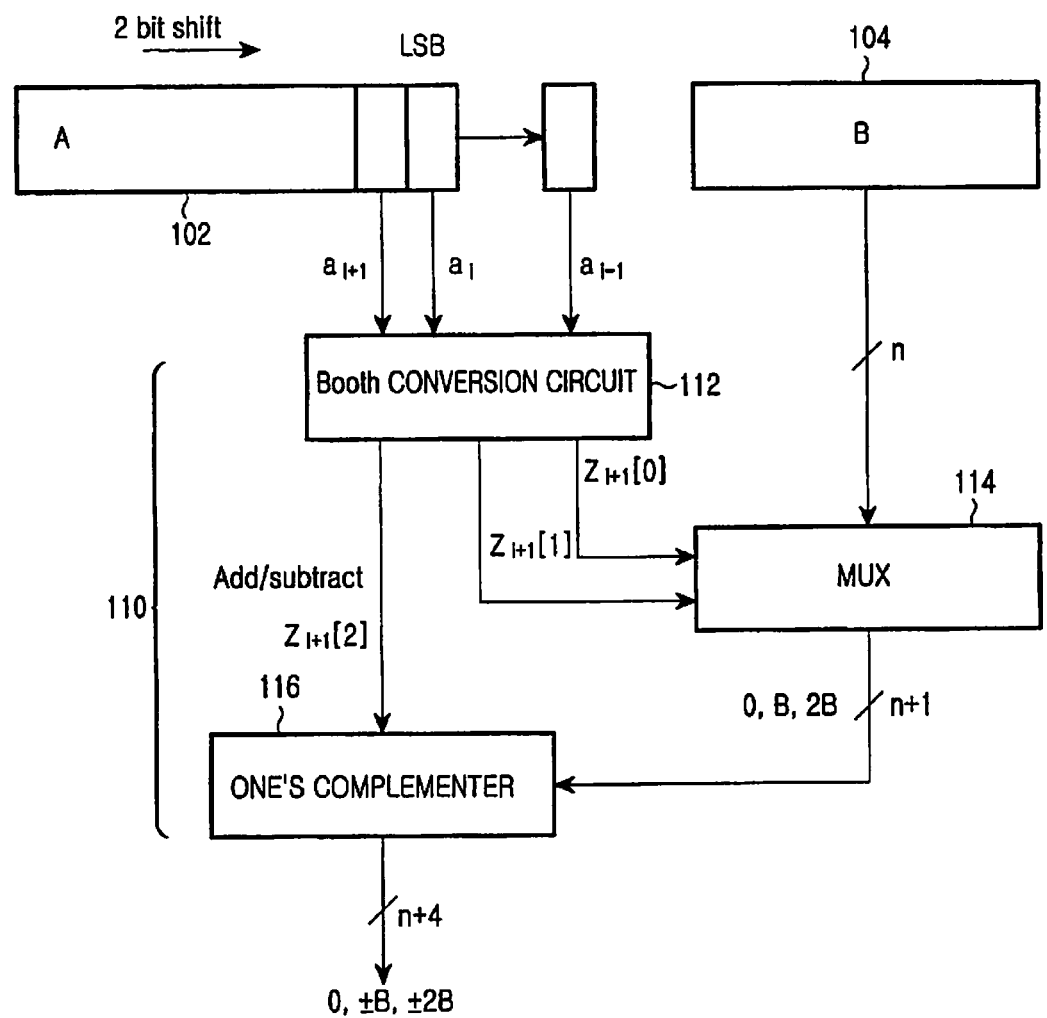
FIG. 2 is a block diagram showing a detailed configuration of a conversion circuit shown in FIG. 1.

FIG. 2 is a block diagram showing a detailed configuration of the conversion logic 110 shown in FIG. 1.

Referring to FIG. 2, the conversion logic 110 Booth-converts two lesser bits ($a_{i+1},a_i$) of the multiplier A and a reference bit $a_{i-1}$, with bits of the multiplier A being sequentially shifted, multiplexes the multiplicand B according to the Booth-converted result value $z_{i+1}$, and outputs signed binary numbers of (n+4) bits. In FIG. 1, the Booth-converted result value $z_{i+1}$ is shown separately for individual output bits, for example, shown as $z_{i+1}[2]$, $z_{i+1}[1]$, $z_{i+1}[0]$. Herein, the multiplicand B is multiplexed according to $z_{i+1}[1]$ and $z_{i+1}[0]$, and an output of a multiplexer (MUX) 114 is selectively signed according to $z_{i+1}[2]$ being input to a one's complementer 116. Therefore, the $z_{i+1}[2]$ will be called a sign bit of the multiplicand B. For example, when the sign bit value $z_{i+1}[2]$ of the Booth-converted result is '1', the conversion logic 110 performs a one's complementary operation on the output of the MUX 114 and outputs a signed extension binary value of the final (n+4) bits, and when the sign bit value $z_{i+1}[2]$ of the Booth-converted result is '0', the conversion logic 110 extends the output value of the MUX 114 to (n+4) bits and outputs the (n+4) bits. For this purpose, a shift register 102 for sequentially shifting bits of the multiplier A to generate a shifted bit string and a register 104 for storing the multiplicand are provided at the front stage of the conversion logic 110. The conversion logic 110 also includes a Booth conversion circuit 112, a multiplexer (MUX) 114, and a one's complementer 116. The Booth conversion circuit 112 Booth-converts two lesser bits $a_{i+1}$ and $a_i$ of the generated bit string and a reference bit $a_{i+1}$, and outputs, for example, a 3-bit result value ($z_{i+1}[2]$, $z_{i+1}[1]$, $z_{i+1}[0]$: $z_{i+1}$). The multiplexer 114 multiplexes the multiplicand B according to the result $z_{i+1}$ of the Booth conversion, and outputs 0, B and 2B as a result of multiplexing. The one's complementer 116 performs a one's complement operation on the output of the multiplexer 114 that receives the two lesser bits of the generated bit string, and outputs signed binary numbers of the (n+4) bits. The conversion logic 110, which is a circuit for implementing a modified Booth conversion based on the multiplier A, outputs a signed extension bit of (n+4) bits, which is one of the values 0, ±B, and ±2B. As described above, the present invention uses a scheme of calculating a partial sum by selectively performing a one's complementary operation on the multiplicand B according to the sign bit value $z_{i+1}[2]$. The use of this scheme contributes to a reduction in the power consumption and the number of gates of the signal processing apparatus that performs modular multiplication in the resource-limited environment.

Figure 3:
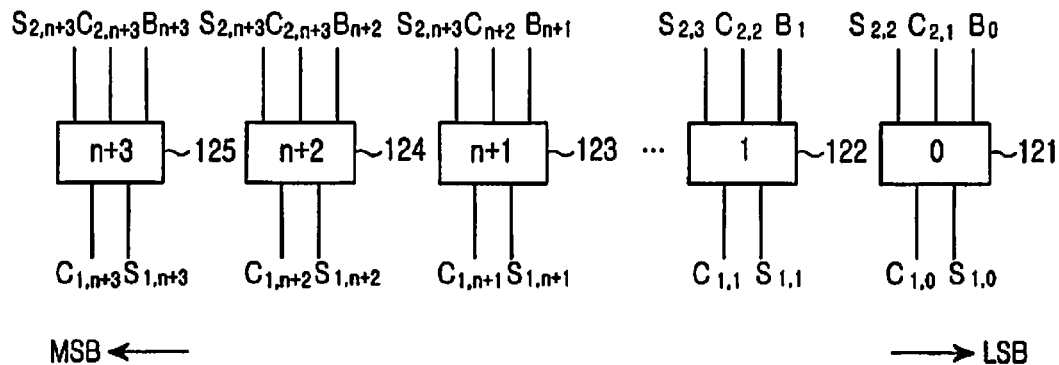
FIG. 3 is a block diagram showing a detailed configuration of the first carry save adder shown in FIG. 1.

FIG. 3 is a block diagram showing a detailed configuration of the CSA1 120 shown in FIG. 1.

Referring to FIG. 3, the CSA1 120 having (n+4) full adders 121 to 125 has as its inputs first signals $S_{2,2}$ to $S_{2,n+3}$ of (n+2) bits, second signals $C_{2,1}$ to $C_{2,n+3}$ of (n+3) bits, and third signals $B_0$ to $B_{n+3}$ being the binary numbers of (n+4) bits from the conversion logic 110, and full-adds the inputs by means of the (n+4) full adders 121 to 125 to output carry values $C_{1,0}$ to $C_{1,n+3}$ and sum values $S_{1,0}$ to $S_{1,n+3}$ of (n+4) bits. Here, an (n+2)th higher bit $S_{2,n+3}$ of the first signals is input to the three higher full adders 123 to 125, and an (n+3)th higher bit $C_{2,n+3}$ of the second signals is input to two the higher full adders 124 and 125.

Figure 4:
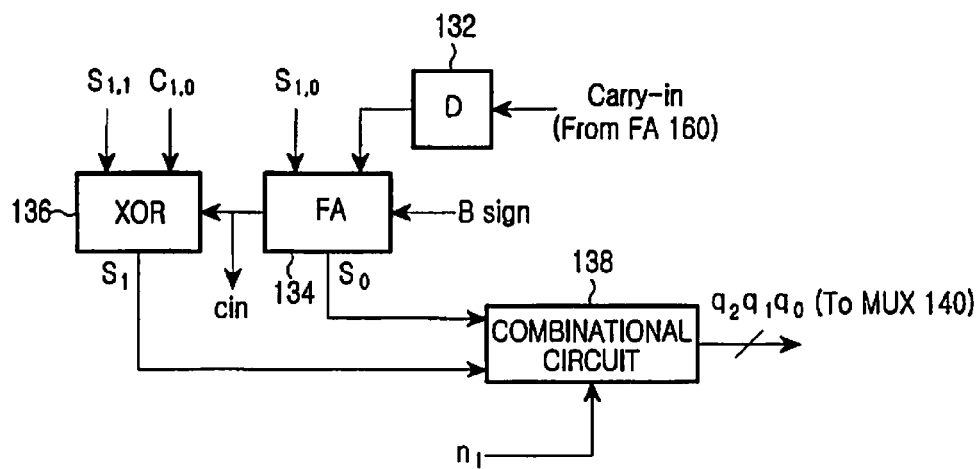
FIG. 4 is a block diagram showing a detailed configuration of the quotient logic shown in FIG. 1.

FIG. 4 is a block diagram showing a detailed configuration of the quotient logic 130 shown in FIG. 1.

Referring to FIG. 4, the quotient logic 130 has as its inputs sum values $S_{1,0}$ and $S_{1,1}$ output from the two lower full adders and a carry value $C_{1,0}$ output from lowest full adder, which are selected from the carry values and sum values of (n+4) bits from the CSA1 120, and outputs a determination value $q_2q_1q_0$ of 3 bits to determine a multiple of modular reduction. The quotient logic 130 consists of a D flip flop 132, a full adder 134, an exclusive OR (XOR) logic gate 136, and a combinational circuit 138. The D flip flop 132 temporarily stores a carry input value, Carry-in, provided from the FA 160 of FIG. 1. The full adder 134 full-adds the carry input value Carry-in stored in the D flip flop 132 and the sum value $S_{1,0}$ output from the least significant bit full adder 121 of the CSA1 120. The exclusive OR logic 136 performs an exclusive Or operation between the carry value $C_{1,0}$ output from the least significant bit full adder 121 of the CSA1 120 and the sum value $S_{1,1}$ output from a lower second full adder 122 of the CSA1 120. The full adder 134 generates a preset carry value cin for correction, and is provided with a sign bit B sign of the multiplicand B, though not shown in FIG. 1. In the present invention, the carry value cin for correction, output from the full adder 134 of the quotient logic 130 at the current clock, is input to the full adder 160 of FIG. 1 as described above, and the fuller adder 160 determines a carry input value Carry-in to be used in the quotient logic 130 at the next clock based on the carry value cin for correction. The combinational circuit 138 combines the other output $S_0$ from the full adder 134, the output $S_1$ from the exclusive OR logic 136, and a preset input bit n1, and outputs the determination value $q_2q_1q_0$ of 3 bits, which is a value for determining a multiple of modular reduction. The proposed scheme of providing a carry value cin to correct a previous clock output from the quotient logic 130 of FIG. 1 to the fuller adder 160, and determine a carry input value Carry-in to be used in the quotient logic 130 can also contribute to a reduction in the power consumption and the number of gates of the signal processing apparatus that performs modular multiplication.

Figure 5:
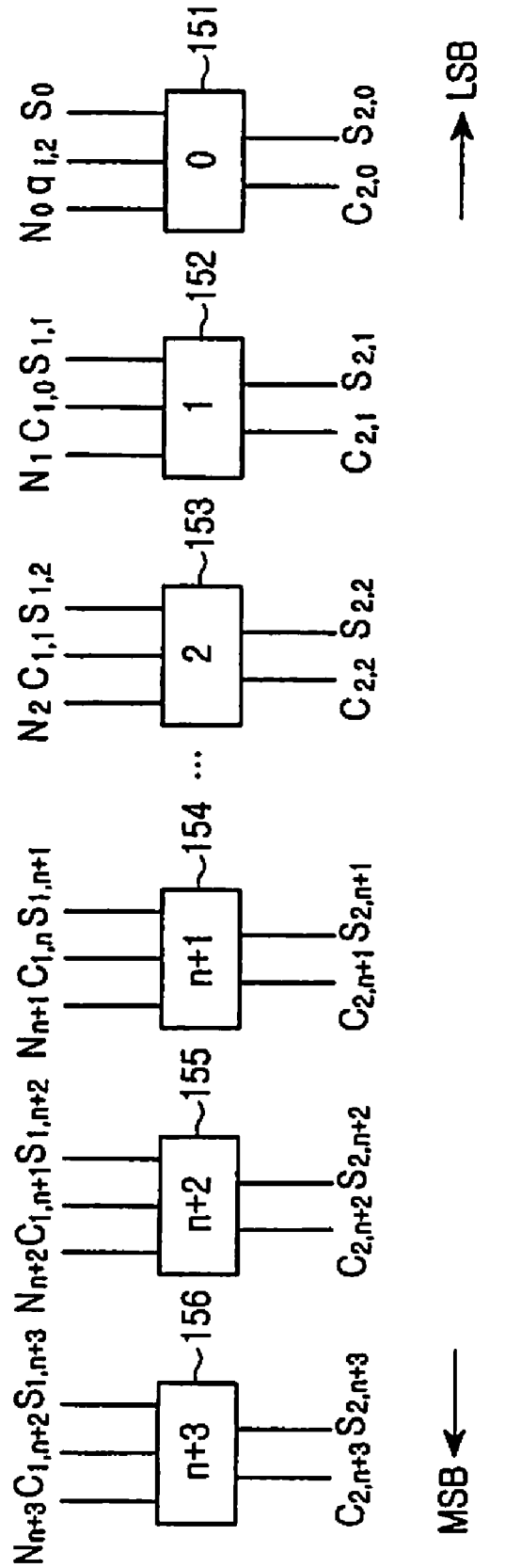
FIG. 5 is a block diagram showing a detailed configuration of the second carry save adder shown in FIG. 1.

FIG. 5 is a block diagram showing a detailed configuration of the CSA2 150 shown in FIG. 1.

Referring to FIG. 5, the CSA2 150 includes (n+4) full adders 151 to 156. The CSA2 150 includes the modulus N ($N_0$-$N_{n+3}$) of (n+4) bits selected from the selector 140 as a first input signal, and remaining carry values $C_{1,0}$ to $C_{1,n+3}$ of (n+3) bits, except a most significant bit carry value of the carry values of (n+4) bits, from the CSA1 120 as a second input signal, and remaining sum values $S_{1,1}$ to $S_{1,n+3}$ of (n+3) bits, except a least significant bit sum value of the sum values of (n+4) bits, from the CSA1 120 as a third input signal to output carry values $C_{2,0}$ to $C_{2,n+3}$ of (n+4) bits and sum values $S_{2,0}$ to $S_{2,n+3}$ of (n+4) bits by means of the (n+4) full adders 151 to 156. As for the (n+4) bits of the first input signal, the (n+4) bits of the modulus N ($N_0$~$N_{n+3}$) are input individually, carry values $C_{1,0}$~$C_{1,n+2}$ of the (n+3) bits of the second input signal are sequentially input from a second lower full adder 152 among the full adders, and sum values $S_{1,1}$~$S_{1,n+3}$ of the (n+3) bits of the third input signal are sequentially input from the second lower full adder 152 among the full adders 152 to 156. The least significant bit full adder 151 of the full adders 151 to 156 is input with the output $S_0$ from the full adder 134 of the quotient logic 130, a second output bit $q_{i,2}$ of the combinational circuit 138, and a least significant bit $N_0$ of the modulus N.

Figure 6:
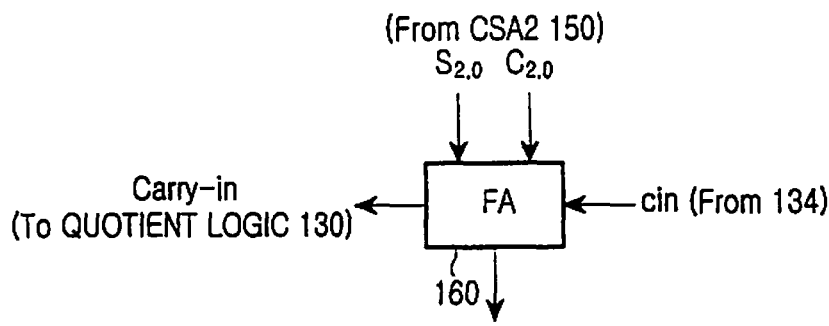
FIG. 6 is a block diagram showing a detailed configuration of the full adder shown in FIG. 1.
Figure 7:
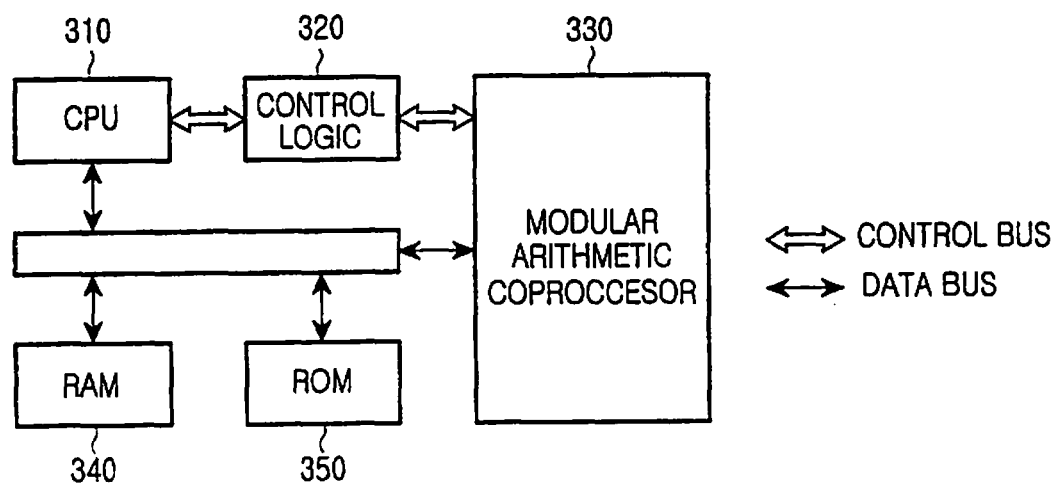
FIG. 7 is a block diagram showing an example of application of the modular multiplication apparatus in accordance with the embodiment of the present invention.

FIG. 6 is a block diagram showing a detailed configuration of the full adder 160 shown in FIG. 1.

Referring to FIG. 6, the full adder 160 full-adds a carry value $C_{2,0}$ output from the least significant bit full adder 151 of the CSA2 150 and a sum value $S_{2,1}$ output from the second lowest full adder 152 to output a carry input value Carry-in. The full adder 160 is also provided, from the quotient logic 130, with a carry value cin for correction preset for full add operation and outputs the carry input value Carry-in as a result of the full add operation. The carry input value Carry-in is provided to the quotient logic 130.

A principle of the present invention having the foregoing configuration will now be described. The present invention provides a signal processing apparatus for calculating $A \cdot B \cdot R^{-1} \bmod N$ in m+2 clocks with A, B and N (where $R=4^{m+2}$, m=n/2, $-N \leq A$, and $B<N$), each having n bits as its inputs. Three principles that are applicable to the implementation of the present invention will be described. The three principles include a first principle of representation of the multiplier A and the multiplicand B for modular multiplication, a second principle of calculating a one's complement-based partial product using 2 bits of the multiplier A for modular multiplication, and a third principle of using the Booth conversion and the one's complement-based partial product of the present invention.

Number Representation

In the present invention, the multiplier A and the multiplicand B are represented by signed binary numbers for the modular multiplication. A and B, each having n bits, are respectively transformed to sign extension binary numbers of (n+4) bits for signed operation. During this transformation, any negative values are transformed to their one's complement.

Booth's Conversion

The present invention Booth-converts the multiplier A using the well-known Booth recording scheme. Therefore, the Booth recording will be referred to herein as Booth conversion. The multiplier A is converted into $z_{i+1}$ (where $0 \leq i \leq m+1$) as it is shifted by two bits by means of the Booth conversion scheme. Here, it is assumed that $a_{n+4}=a_{n+3}$, $a_{-1}=0$. The following Table 1 shows a rule of the Booth conversion according to the present invention. In addition, as shown in FIG. 2, the multiplicand 0, B or 2B is output via the multiplexer 114 according to the two bit values $z_{i+1}[1]$, $z_{i+1}[0]$. As shown in FIG. 2, to find a signed partial product −B or −2B, a one's complementary operation is selectively performed on the output of the multiplexer 114 based on the sign bit $z_{i+1}[2]$ in the Booth-converted value. The determined partial product is provided as an input to the CSA 120 of FIG. 1, and this characteristic can contribute to a reduction in the power consumption and the number of gates required for implementation of (n+4) full adders. This characteristic can be effectively applied to the resource-limited environment such as the smart card.

TABLE 1

| $a_{i+1}$ | $a_i$ | $a_{i-1}$ | Partial product | $z_{i+1}$ |
|---|---|---|---|---|
| 0 | 0 | 0 | 0 | 0 [000] |
| 0 | 0 | 1 | B | 1 [001] |
| 0 | 1 | 0 | B | 1 [001] |
| 0 | 1 | 1 | 2B | 2 [010] |
| 1 | 0 | 0 | −2B | −2 [110] |
| 1 | 0 | 1 | −B | −1 [101] |
| 1 | 1 | 0 | −B | −1 [101] |
| 1 | 1 | 1 | 0 | 0 [000] |

In Table 1, the Booth-converted result value $z_{i+1}$ is expressed in a signed decimal number with three bits of $z_{i+1}[2]$, $z_{i+1}[1]$, $z_{i+1}[0]$, and $z_{i+1}$ can be expressed as a binary number in the brackets. In the partial product of Table 1, a negative number can be expressed as a one's complementary number.

Radix-4 Montgomery Algorithm Using Partial Products Based on One's Complementary Operation The algorithm illustrated in the following Equation 1 shows that the present invention employs the Booth conversion scheme and the one's complementary operation-based partial products for radix-4 Montgomery modular multiplication. An original Montgomery algorithm compares a result value with a modulus N, and performs a subtraction operation if the result value is greater than the modulus N. However, the following algorithm of the present invention does not show such a comparison and subtraction operation of the original Montgomery algorithm.

Equation 1

Input: $N, -N \leq A, B < N$

Output: $S = A \cdot B \cdot 4^{-m-2} \bmod N, -N \leq S < N$ $$S = 0 \qquad (1)$$

$$\text{for } i = 0 \text{ to } \lceil (n+1)/2 \rceil \qquad (2)$$

$$S = S + A_i \times B \qquad (3)$$

$$q_{i(2,1,0)} = f(s_1, s_0, n_1, n_0) \qquad (4)$$

$$S = S + q_i \times N \qquad (5)$$

$$S = S/2^2 \qquad (6)$$

$$\text{end for} \qquad (7)$$

In the algorithm of Equation 1, $A_i \times B$ in procedure (3) refers to a partial product that is expressed in the form of a one's complementary number based on two Booth-converted bits. Procedure (4) refers to a function that causes two least significant bits of the result values in procedure (5) to be '0'. Result values in procedure (4) depend on input bits $s_1$, $s_0$, $n_1$, and $n_0$ and are determined as shown in the following Equation 2. $q_{i,2}$, the most significant bit (MSB) of a value $q_i$ used for modular reduction, is a sign bit. The remaining two bits $q_{i,1}q_{i,0}$ are selected from among elements {0, 1, 2}. $q_i$ is calculated according to the following Table 2.

Equation 2

$q_0 = s_0$ $q_1 = \overline{s_0}s_1$ $q_i = \overline{s_0}s_1$ $q_2 = s_0\overline{s_1 n_1} + \overline{s_0}s_1 n_1$ $q_2 = s_0\overline{s_1 n_1}\overline{s_0 s_1 n_1}$

TABLE 2

| $S_0$ | $s_1$ | $n_1$ | $q_2$ | $Q_1 q_0$ |
|---|---|---|---|---|
| 0 | 0 | 0 | 0 | 00 |
| 0 | 0 | 1 | 0 | 00 |
| 0 | 1 | 0 | 0 | 10 |
| 0 | 1 | 1 | 0 | 10 |
| 1 | 0 | 0 | 1 | 01 |
| 1 | 0 | 1 | 0 | 01 |
| 1 | 1 | 0 | 0 | 01 |
| 1 | 1 | 1 | 1 | 01 |

An operation of the present invention will now be described in detail.

The signal processing apparatus of the present invention as shown in FIG. 1 calculates $A \cdot B \cdot R^{-1} \bmod N$ in m+2 clocks with A, B and N (where $R=4^{m+2}$, m=n/2, $-N \leq A$, and $B<N$), each having n bits as its inputs.

A procedure for calculating $A \cdot B \cdot R^{-1} \bmod N$ (where, $R=4^{m+2}$) by the apparatus shown in FIG. 1 will now be described. In the following description, step a) is an initialization step, steps b) to h) are steps to be performed every clock, and step i) is a step to be performed after steps b) to h) are performed during (m+2) clocks.

a) A, B, N, each having n bits, input for modular multiplication, are stored in respective registers (or memories). Although the apparatus of the present invention is shown to store the inputs A and B in respective registers 102 and 104 without showing a separate register in which N is stored, it is apparent to those skilled in the art that such a separate register is used in the apparatus of the present invention. Here, the register 102 in which A is stored is a shift register in which A is shifted to the right side by two bits for each clock. For convenience's sake, the register in which the multiplier A is stored is indicated as register A and the register in which the multiplicand B is stored is indicated as register B. With respect to the memory, A and B are read out one word at a time. Temporary registers (or memories) C and S (both not shown in detail), in which a result of the calculation by the CSA2 150 shown in FIG. 1 is temporarily stored, are initialized as '0'.

b) When all data is input into each of the registers 102 and 104, the Booth conversion circuit 112 of the conversion logic 110 performs Booth conversion based on the two LSB bits in the register 102 and the reference bit $a_{i-1}$, and outputs $z_{i+1}$ (where $0 \leq i \leq m+1$). As shown in FIG. 2, as for the multiplicand B stored in the register 104, 0, B, or 2B is output via the MUX 114 according to two bits $z_{i+1}[1]$ and $z_{i+1}[0]$. For example, when $z_{i+1}[2]$="1," the output of the MUX 114 is inverted through the one's complementer 116, and when $z_{i+1}[2]$="0," the output of the MUX 114 is output intactly without being inverted as a one's complementary number. That is, when the sign bit $z_{i+1}[2]$) is "1," the one's complementer 116 finds a one's complementary number for the (n+1) bits output from the MUX 114, and outputs a signed extension binary value of the final (n+4) bits by padding '1' to the higher 3 bits of the output value. When the sign bit $z_{i+1}[2]$ of the Booth-converted result is "0," the one's complementer 116 receives an (n+1)-bit value output from the MUX 114, and extends it to (n+4) bits by padding '0' to its higher 3 bits. By this operation, the output of the one's complementer 116 becomes one of 0, ±B and ±2B.

c) The CSA1 120 performs an add operation for three input signed binary numbers of n+4 bits. The CSA1 120 is composed of n+4 full adders 121 to 125. Carries generated in full adders of the CSA1 120 are provided as inputs to the full adder of the CSA2 150 at the next stage, while carries generated in the MSB full adder 125 are ignored.

d) The quotient logic 130 has as its inputs output values $S_{1,1}$, $C_{1,0}$, and $S_{1,0}$ from the CSA1 120, a Carry-in signal provided from the full adder 160, a sign bit B sign of the multiplicand B, and calculates and outputs $S_1$ and $S_0$ by means of the full adder 134 and the exclusive OR logic 136. The carry value cin for correction is input to the full adder 134. The carry value cin for correction is provided as an input to the full adder 160.

e) The combinational circuit 138 of the quotient logic 130 has as its input $S_1$ and $S_0$ calculated in step d) and determines a value q of 3 bits by means of a truth table of Table 4. Although a detailed configuration of a circuit to determine the value of q by means of the truth table of Table 4 is not shown, it is apparent to those skilled in the art that a circuit for determining the value of q can be implemented by a general logic gate circuit. The selector 140, provided for outputting one of 0, N, 2N, and –N according to a value of 3 bits $q_2 q_1 q_0$ determined for an input modulus N, includes functions of a multiplexer (MUX) and a one's complementer (not shown). For example, when 0, N, or 2N is selected according to lower 2 bits $q_1 q_0$ of the q and the sign bit $q_2$ of the q is '1', a one's complementary value for N selected in the multiplexer (not shown) in the selector 140 and the sign bit $q_2$ itself are output as inputs to the CSA2 150. When the sign bit $q_2$ of the q is '0', one of 0, N, and 2N selected in the multiplexer (not shown) in the selector 140 is provided as an input to the CSA2 150.

f) The CSA2 150 has as its inputs carry values and sum values obtained as outputs of the CSA1 120 in step c), and a signed binary number of n+4 bits of one of 0, ±N, and ±2N determined by values of q obtained in step e) to perform an n+4 bit signed operation. The CSA2 150, like the CSA1 120, is composed of n+4 full adders 151 to 156. The full adders 151 to 156 of the CSA2 150 has, as its carry input of the least significant full adder 151, an MSB value $q_{1,2}$, or a sign bit of the value of q calculated in step e), and has as a sum bit a value $S_0$ which is a sum output bit of the full adder 134.

g) The full adder 160 has as its inputs $S_{2,1}$ and $C_{2,0}$ bits of output values of the CSA2 150 and bits of the carry value cin for correction to output Carry-in bits through full adding of the inputs. Herein, the Carry-in bits are stored in the D flip flop 132, and then used for determining a value of q at the next clock.

h) Higher (n+2) sum values and higher (n+3) carry values of the outputs of the CSA2 150 are fedback to the CSA1 120 as its input. At this time, $S_{2,n+3}$ being the MSB of a sum value which is an output from the MSB full adder 156 of the CSA2 150 is copied and two bits are added thereto, and $C_{2,n+3}$ being the MSB of a carry value which is an output from the MSB full adder 156 of the CSA2 150, are copied and one bit is added thereto. Results of such a copy and an addition for $S_{2,n+3}$ and $C_{2,n+3}$ are input to the CSA1 120. The sum value $S_{2,n+3}$ output from the full adder 156 of the CSA2 150 is provided to three full adders 123 to 125 of the CSA1 120, and the carry value $C_{2,n+3}$ is provided to two full adders 124 and 125 of the CSA1 120.

i) The CPA operation by the CSA2 150 is performed after steps b) to h) are performed during (m+2) clocks. That is, the CSA2 150 receives Carry-in bits generated in the last step g) as a carry input value for a CPA operation, and performs an addition operation for the carry value and the sum value, which are outputs of the CSA2 150. If a result value of the addition is a negative number, a modulus N is added thereto, but if the result value of the addition is a positive number, the modulus N is not added thereto. In this manner, the present invention can perform the CPA operation using the CSA2 150 without using any separate CPA to find the last modular multiplication result.

For example, if each of A, B and N has 12 bits as shown in the following Equation 3, a Montgomery modular operation result according to the above-described procedure is as shown in the following Table 3 and Table 4.

Equation 3

$N=0000.1010.0101.1001$ (0x$A59$)
$B=0000.0101.1100.0011$ (0x$5C3$)

$N'=1111.0101.1010.0110$  $B'=1111.1010.0011.1100$ $2N=0001.0100.1011.0010$  $2B'=1111.0100.0111.1001$ $A=0000.1001.0011.1110$ (0x$93E$)

TABLE 3

| i | $A_i$ | CSA1 out S C | B-sign | Carry-in | $S_1S_0$ | C |
|---|---|---|---|---|---|---|
| I | 0 | 0000.0000.0000.0000<br>0.0000.0000.0000.000 | 0 | 0 | 00 | 0 |
| 0 | -2 | 1111.0100.0111.1001<br>0.0000.0000.0000.000 | 1 | 0 | 10 | 1 |
| 1 | 0 | 1111.0010.0010.1010<br>0.0001.0000.0010.100 | 0 | 1 | 11 | 0 |
| 2 | 0 | 1111.0011.0000.0000<br>0.0001.0000.0010.100 | 0 | 1 | 01 | 0 |
| 3 | 1 | 1111.1000.1111.0000<br>0.0000.1011.0000.011 | 0 | 1 | 11 | 0 |
| 4 | 1 | 1111.1110.1000.0000<br>0.0000.1010.1101.011 | 0 | 1 | 11 | 0 |
| 5 | -2 | 0000.1110.1001.0010<br>1.1110.1010.1101.001 | 1 | 1 | 10 | 1 |
| 6 | 1 | 1111.1110.1011.0110<br>0.0000.1010.1001.001 | 0 | 1 | 01 | 0 |
| 7 | 0 | 1111.1111.0011.1011<br>0.0000.0000.0000.000 | 0 | 1 | 00 | 1 |

TABLE 4

| i | $A_i$ | $S_1S_0$ | C | $q_2q_1$ | CSA2 out S C | Carry-in |
|---|---|---|---|---|---|---|
| i | 0 | 00 | 0 | 000 | 0000.0000.0000.0000<br>0.0000.0000.0000.000 | 0 |
| 0 | -2 | 10 | 1 | 010 | (11).1110.0000.1100.1010<br>(0)0.0010.1000.0110.000 | 1 |
| 1 | 0 | 11 | 0 | 001 | (11).1110.0000.0101.0010<br>(0)0.0010.0100.0101.001 | 1 |
| 2 | 0 | 01 | 0 | 101 | (00).0001.0110.1000.1110<br>(1)1.1110.0010.0100.001 | 1 |
| 3 | 1 | 11 | 0 | 001 | (11).1111.1001.1010.1110<br>(0)0.0001.0100.1010.001 | 1 |

TABLE 4-continued

| i | $A_i$ | $S_1S_0$ | C | $q_2q_1$ | CSA2 out S C | Carry-in |
|---|---|---|---|---|---|---|
| 4 | 1 | 11 | 0 | 001 | (11).1111.1110.0000.1110<br>(0)0.0001.0101.1010.001 | 1 |
| 5 | -2 | 10 | 1 | 010 | (11).1111.0000.1111.0010<br>(0)0.0001.1101.0010.010 | 1 |
| 6 | 1 | 01 | 0 | 101 | (00).0000.0001.1000.0010<br>(1)1.1111.1101.0110.111 | 1 |
| 7 | 0 | 00 | 1 | 000 | 1111.1111.1011.1010<br>0.0000.0000.0000.000 | 1 |

A procedure for calculating the modular multiplication A·BmodN using the result values of the operation by the apparatus of the present invention as described above will now be described. It should be noted that a hardware configuration for performing the procedure is apparent to those skilled in the art, and hence, detailed explanation thereof is omitted. The following calculations are performed:

1) Calculate $P=2^{2(n+4)} \bmod N$;
2) Calculate $C=A \cdot B \cdot 2^{-(n+4)} \bmod N$; and
3) Calculate $P \cdot C \cdot 2^{-(n+4)} \bmod N = A \cdot B \bmod N$.

A procedure for calculating the modular exponentiation, $m^e \bmod N$, required to perform the RSA operation using the result values of the operation of the apparatus of the present invention as described above will now be described. The following operations are performed:

1) Store an exponent e in a register (or a memory);
2) Store a modulus N in the temporary register;
3) Initialize the temporary registers C and S to '0';
4) Perform Montgomery modular multiplication, $m'=f_m(m,P,N)=m \cdot P \cdot R^{-1} \bmod N$, where P in the modular exponentiation is a pre-calculated value defined in step 1) for the modular multiplication operation the aforementioned procedure, and $R=2^{n+4}$;
5) Load m' into the register B;
6) Perform modular square operation using a value loaded into the register B, here, where the multiplier A required for the Montgomery modular multiplication is loaded from the register B and its value is obtained by using the Booth conversion circuit;
7) Shift the exponent e to the left;
8) Ignore MSB 1 of the exponent e and perform subsequent steps 9) and 10) after the next bits;
9) Perform steps 4) and 5) for the modular square operation regardless of a bit (0 or 1) of the exponent e, where, the multiplier and the multiplicand, which are required for the square operation, are stored in the register A and the register B, respectively;
10) If the current bit of the exponent e is 1, perform step 4) and 5) for the modular multiplication after performing step 9), where, the multiplicand is the content of the register B and the multiplier is the base m' in the exponentiation; and
11) Perform the modular multiplication once more using step 4) after performing steps 8) to 10) for all bits of the exponent e, where, the multiplicand is the content of the register B and the multiplier is 1.

If a result value of the performance of the CPA for values remaining in the registers C and S after performing the above steps 1) to 11) is a negative number, the modulus N is added thereto. Otherwise, if the result value is a positive number, it becomes a final value of the exponentiation, $m^e \bmod N$, with no addition of the modulus N.

C. Exemplary Application of the Invention

FIG. 7 illustrates exemplary application of the modular multiplication apparatus according to an embodiment of the present invention. Specifically, FIG. 7 is a diagram illustrating the configuration of a smart (IC) card capable of performing encryption, authentication or electronic signature.

In FIG. 7, a modular arithmetic coprocessor 330, including therein the modular multiplication apparatus of FIG. 1, performs modular multiplication necessary for encryption and/or electronic signature. A Read Only Memory (ROM) 350 includes therein a security module for processing the data that needs security, like the key value necessary for encryption, authentication or electronic signature. A Central Processing Unit (CPU) 310 performs the entire control operation for decrypting the operation result of the modular arithmetic coprocessor 330, and performing encryption, authentication or electronic signature using the decryption result and the security module.

As apparent from the above description, the present invention provides a circuit for calculating $A \cdot B \cdot 2^{-(n+4)} \mod N$. The present invention can provide a signal processing apparatus and method for performing the modular multiplication $A \cdot B \mod N$ by means of the circuit with a small number of gates with low power consumption. In addition, the present invention can provide a signal processing apparatus and method for modular multiplication that can operate at high speed in the resource-limited environment, like the smart card, and can reduce power consumption. $A \cdot B \mod N$ calculated according to the present invention is applicable to hardware apparatuses employable for devices in generating and verifying digital signatures. In addition, the present invention is applicable to hardware apparatuses for generating electronic signatures, authentication, and encryption/decryption based on IC card. In addition, the present invention can provide devices for encrypting and decrypting data or information by means of the electronic signature apparatus for performing the modular multiplication. Furthermore, the present invention can be used to implement existing public key cryptography systems such as NIST-DSS, RSA, ElGamal, and Schnorr electronic signatures, based on the electronic signature apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A signal processing apparatus for performing modular multiplication in an electronic device, the apparatus comprising:
   a first logic for outputting a signed multiplicand by selectively performing a one's complementary operation on a multiplicand according to a Booth conversion result of a multiplier in modular multiplication;
   a second logic for outputting a modulus which is signed in the modular multiplication based on a carry input value Carry-in of a current clock, determined from a carry value cin for correction of a previous clock, and on a sign bit of the multiplicand; and
   a third logic for receiving the signed multiplicand and the signed modulus, and outputting a result value of the modular multiplication by iteratively performing a full addition operation on a carry value C and a sum value S of the full addition operation, found at the previous clock.

2. The apparatus of claim 1, wherein the first logic receives two least significant bits of the multiplier and a predetermined reference bit while sequentially shifting bits of the multiplier, and performs the Booth conversion thereon.

3. The apparatus of claim 1, wherein the first logic comprises:
   a Booth conversion circuit for performing the Booth conversion using the two least significant bits of the multiplier and the reference bit;
   a multiplexer for multiplexing the multiplicand based on the two least significant bits of the multiplier; and
   a one's complementer for outputting the signed multiplicand by selectively performing the one's complementary operation on the output of the multiplexer based on a sign bit of the Booth conversion result.

4. The apparatus of claim 1, wherein the third logic performs the full addition operation using at least two Carry Save Adders (CSAs) each including a plurality of full adders.

5. The apparatus of claim 1, wherein the second logic comprises:
   a quotient logic for determining at every clock first bit values which are extracted as many values as a predetermined number of bits, beginning from a least significant bit for each of the carry value and the sum value calculated in the third logic, and second bit values for determining a multiple of modular reduction in the modular multiplication based on the carry input value Carry-in and a sign bit of the multiplicand; and
   a selector for selecting the signed modulus based on the second bit values.

6. The apparatus of claim 1, wherein the third logic further comprises a full adder for outputting the carry input value Carry-in by performing a full addition operation using the carry value cin for correction and the sign bit of the multiplicand, received from the second logic.

7. The apparatus of claim 1, wherein the third logic performs a carry propagation addition operation on the carry value and the sum value output from the third logic after (m+2) clocks, where m=n/2, when each of the multiplier, the multiplicand and the modulus has n bits.

8. The apparatus of claim 7, wherein the third logic adds the modulus to the carry propagation addition operation result when a result of the carry propagation addition operation is a negative number.

9. The apparatus of claim 1, wherein the first logic outputs the signed multiplicand by selectively performing the one's complementary operation on the output of the multiplexed multiplicand based on a sign bit of the Booth conversion result.

10. The apparatus of claim 1, wherein the third logic comprises a Carry Save Adder (CSA);
    wherein in a last process of an iterative operation of calculating a result value of the modular multiplication, the CSA operates as a carry propagation adder (CPA).

11. The apparatus of claim 10, wherein in the last process, the CSA receives the carry input value Carry-in and performs an addition operation on the carry value C and the sum value S.

12. A signal processing method for performing modular multiplication in an electronic device, the method comprising:
    outputting a signed multiplicand by selectively performing a one's complementary operation on a multiplicand according to a Booth conversion result of a multiplier in modular multiplication;
    outputting a modulus which is signed in the modular multiplication based on a carry input value Carry-in of a current clock and a sign bit of the multiplicand, wherein the carry input value is determined from a carry value cin to correct a previous clock; and receiving the signed multiplicand and the signed modulus, and outputting a result value of the modular multiplication by iteratively performing a full addition operation on a carry value C and a sum value S of the full addition operation, found at the previous clock.

13. The method of claim 12, wherein the outputting of a signed multiplicand comprises:
receiving two least significant bits of the multiplier and a predetermined reference bit while sequentially shifting bits of the multiplier, and performing the Booth conversion thereon.

14. The method of claim 12, wherein the outputting of a signed multiplicand comprises:
performing the Booth conversion using the two least significant bits of the multiplier and the reference bit;
multiplexing the multiplicand based on the two least significant bits of the multiplier; and
outputting the signed multiplicand by selectively performing the one's complementary operation on the output of the multiplexed multiplicand based on a sign bit of the Booth conversion result.

15. The method of claim 12, wherein the finding of a carry input value Carry-in comprises:
outputting the carry input value Carry-in by performing a full addition operation using the carry value cin for correction and the sign bit of the multiplicand.

16. The method of claim 12, further comprising performing a carry propagation addition operation on the carry value and the sum value after ($m_{+2}$) clocks, where m=n/2, when each of the multiplier, the multiplicand and the modulus has n bits.

17. The method of claim 12, further comprising adding the modulus to the carry propagation addition operation result, when a result of the carry propagation addition operation is a negative value.

18. The method of claim 12, wherein the full addition operation is performed using at least two Carry Save Adders (CSAs) each including a plurality of full adders.

19. The method of claim 12, wherein the outputting of a signed modulus comprises:
extracting, at every clock, as many first bit values as a predetermined number of bits beginning from a least significant bit for each of the carry value and the sum value;
outputting second bit values for determining a multiple of modular reduction in the modular multiplication based on the first bit values, the carry input value Carry-in and a sign bit of the multiplicand; and
selecting the signed modulus based on the second bit values.

20. The method of claim 12, wherein the outputting of a signed multiplicand comprises:
outputting the signed multiplicand by selectively performing the one's complementary operation on the output of the multiplexed multiplicand based on a sign bit of the Booth conversion result.

21. The method of claim 12, wherein the calculating of a result value of the modular multiplication comprises performing an operation of a Carry Propagation Adder (CPA) using a Carry Save Adder (CSA).

22. The method of claim 21, wherein in a last process of calculating the result value, the CSA receives the carry input value Carry-in and performs an addition operation on the carry value C and the sum value S.

23. A smart card with a modular arithmetic coprocessor, comprising:
a Read Only Memory (ROM) with a security module for processing data including a key value required for encryption, authentication or electronic signature; and
a Central Processing Unit (CPU) for controlling an operation of decrypting an operation result of the modular arithmetic coprocessor and performing encryption, authentication or electronic signature using the decryption result and the security module;
wherein the modular arithmetic coprocessor includes:
a first logic for outputting a signed multiplicand by selectively performing a one's complementary operation on a multiplicand according to a Booth conversion result of a multiplier in modular multiplication;
a second logic for outputting a modulus which is signed in the modular multiplication based on a carry input value Carry-in of a current clock, determined from a carry value cin for correction of a previous clock, and on a sign bit of the multiplicand; and
a third logic for receiving the signed multiplicand and the signed modulus, and outputting a result value of the modular multiplication by iteratively performing a full addition operation on a carry value C and a sum value S of the full addition operation, found at the previous clock.

24. The smart card of claim 23, wherein the first logic comprises a one's complementer for outputting the signed multiplicand by selectively performing the one's complementary operation based on a sign bit of the Booth conversion result.

25. The smart card of claim 23, wherein the third logic further comprises one of a full adder for outputting the carry input value Carry-in by performing a full addition operation using the carry value cin for correction and the sign bit of the multiplicand, received from the second logic, and a Carry Save Adder (CSA), wherein in a last process of an iterative operation of calculating a result value of the modular multiplication, the CSA operates as a carry propagation adder (CPA).

* * * * *